United States Patent [19]

Kissin

[11] Patent Number: 5,326,837
[45] Date of Patent: Jul. 5, 1994

[54] CATALYST SYSTEMS FOR SYNDIOSPECIFIC POLYMERIZATION OF STYRENES

[75] Inventor: Yury V. Kissin, East Brunswick, N.J.

[73] Assignee: Mobil Oil Corporation, Fairfax, Va.

[21] Appl. No.: 979,693

[22] Filed: Nov. 20, 1992

[51] Int. Cl.⁵ .................. C08F 4/622; C08F 12/08
[52] U.S. Cl. ...................... 526/150; 526/160; 526/347; 526/347.1; 526/347.2; 502/117; 502/131
[58] Field of Search ............ 526/150, 151, 160, 347.1, 526/347.2, 347

[56] References Cited

U.S. PATENT DOCUMENTS

| | | | |
|---|---|---|---|
| 2,820,778 | 1/1958 | Spaenig et al. | 526/165 |
| 4,404,344 | 9/1983 | Sinn et al. | 526/160 |
| 4,542,199 | 9/1985 | Kaminsky et al. | 526/160 |
| 4,874,734 | 10/1989 | Kioka et al. | 502/104 |
| 4,897,455 | 1/1990 | Welborn, Jr. | 526/129 |
| 4,952,714 | 8/1990 | Welborn, Jr. | 556/179 |
| 5,128,295 | 7/1992 | Porri et al. | 502/117 |

OTHER PUBLICATIONS

Chien et al, Journal of Polymer Science/Pt. A: Polymer Chemistry, 26(11), 3089–3012 (1988).
H. Sinn et al, Adv. Organomet. Chem., 18, 99 (1980).
Racanelli et al, European Polymer Journal, 1970, vol. 6, pp. 751–761.
Porri et al, European Polymer Journal, 1969, vol. 5, pp. 1–13.

Primary Examiner—Fred Teskin
Attorney, Agent, or Firm—Alexander J. McKillop; Malcolm D. Keen; Marina V. Schneller

[57] ABSTRACT

Syndiotactic polystyrene is produced in the presence of a catalyst comprising:
(i) trimethylaluminum,
(ii) at least one of the organotin compounds with general formulae:

$$R_1R_2R_3Sn-O-SnR_4R_5R_6$$

or $R_1R_2R_3Sn-OH$ or $R_1R_2SnO$ or $R_1Sn(O)OH;$ wherein $R_1$, $R_2$, $R_3$, $R_4$, $R_5$ and $R_6$ are the same or different $C_1$–$C_{20}$ alkyl groups or aryl groups or alkylaryl groups,
(iii) one or several derivatives of transition metals having the formula $Cp_nMA_{m-n}$, wherein M is a metal selected from the group of titanium, zirconium and hafnium, Cp is a cyclopentadienyl or a substituted cyclopentadienyl group; n is 0, 1 or 2; m is 4 or 3; and A is selected from the group consisting of a halogen, hydrogen, or an oxyhydrocarbyl group OR', wherein R' is a $C_1$–$C_6$ linear or branched alkyl group, a substituted or non-substituted aryl group, or an arylalkyl group.

42 Claims, No Drawings

CATALYST SYSTEMS FOR SYNDIOSPECIFIC POLYMERIZATION OF STYRENES

BACKGROUND

Syndiotactic polystyrene is a highly crystalline thermoplastic resin with a high melting point (in the 260°-285° C. range), a high crystallization rate, high chemical resistance and excellent mechanical properties which qualify it as thermoplastic engineering resin.

N. Ishihara et al, in a series of patents (Eur. Pat. Appl. EP 210,615, EP 275,943, Jpn. Kokai Tokkyo Koho JP 03 59,010) proposed a number of catalysts which can be employed for syndiospecific polymerization of styrene and its ring-substituted derivatives. All these catalysts include two components. The first component is a titanium compound, such as titanium tetraethoxide, cyclopentadienyltitanium trichloride, solid titanium-containing compounds derived from titanium tetrachloride, and tetrabenzyltitanium. The second component of their catalyst systems is methylaluminoxide which is produced by reacting trimethylaluminum (TMA) either with free water or with hydrates of inorganic salts, such as $CuSO_4 \cdot 5H_2O$. The said titanium compounds are inactive for styrene polymerization if, instead of methylaluminoxane, they are combined solely with trialkylaluminum compounds, such as TMA.

DETAILED DESCRIPTION

The invention relates to a combination of three components comprising a compound containing a transition metal belonging to the IVA Group of Periodic Table, TMA, and particular organotin compounds, can serve as syndiospecific catalysts for polymerization of styrene and its ring-substituted derivatives to highly syndiotactic polymers.

Thus, the catalyst components of this invention comprise:
(i) trimethylaluminum,
(ii) at least one of the organotin compounds with general formulae:

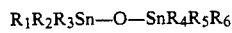

or $R_1R_2R_3Sn-OH$ or $R_1R_2SnO$ or $R_1Sn(O)OH$ where $R_1$, $R_2$, $R_3$, $R_4$, $R_5$ and $R_6$ are the same or different $C_1-C_{20}$ alkyl groups or aryl groups or alkylaryl groups.

(iii) one or several derivatives of transition metals having the formula $Cp_nMA_{m-n'}$, wherein M is a metal belonging to the group of titanium, zirconium and hafnium; Cp is a cyclopentadienyl or a substituted cyclopentadienyl group wherein one or several substituents are alkyl groups of 1 to 6 carbon atoms; n is 0 or 1; m is 4 or 3. In preferred embodiments, n is 1, m is 4 and A belongs to the group consisting of a halogen, hydrogen, or an oxyhydrocarbyl group OR', wherein R' is a $C_1-C_6$ linear or branched alkyl group, a substituted or non-substituted aryl group, or an arylalkyl group.

Typical examples of such transition metal compounds include tetraalkoxides of titanium, zirconium and hafnium, tetraphenoxides of titanium, zirconium and hafnium, monocyclopentadienyltitanium trihalides, monocyclopentadienyltitanium trialkoxides and monocyclopentadienyltitanium triphenoxides.

Typical examples of the employed organotin compounds include bis(triethyltin)oxide, bis(tri-n-butyltin)oxide, trimethyltin hydroxide, triethyltin hydroxide, tri-n-butyltin hydroxide, dimethyltin oxide, diethyltin oxide, di-n-butyltin oxide, methyltinhydroxide oxide, and n-butyltinhydroxide oxide. oxide, methyltinhydroxide oxide, and n-butyltinhydroxide oxide.

The only organoaluminum compound suitable for the use in these catalyst compositions is TMA. Other tested organoaluminum compounds, such as triethylaluminum, triisobutylaluminum, dimethylaluminum chloride, diethylaluminum chloride, ethylaluminum sesquichloride, and ethylaluminum dichloride were found unsuitable for the catalyst formation. An excess of TMA with respect to the organotin compound is required in order for these catalyst compositions to be active. The molar [TMA]:[organotin compound] ratio can be in the 1.05–1000 range, with the preferred range being 2 to 10.

The catalyst compositions comprising at least one of each of said three components polymerize styrene and substituted styrenes to homopolymers with the syndiotactic chain structure, and copolymerize styrene and various substituted styrenes. The substituted styrenes belong to the group of ring-substituted styrenes bearing one or several substituents chosen from an alkyl group, an alkylaryl group or a halogen.

The polymerization reactions can be carried out in slurry processes using pure styrenes or their mixtures with aromatic or aliphatic solvents, at temperatures ranging from 0° to 150° C.

The following examples demonstrate some of the principles of the invention and the nature of the catalyst components as well as the type of polymers produced with the catalyst compositions of the invention.

EXAMPLES

Example 1

To a glass bottle capped with a septum and flushed with nitrogen were added: 20 cc of purified toluene, 5 cc of purified styrene, 5.6 mmol of TMA (used as 20 wt.% solution in heptane), 1.4 cc (2.82 retool) of bis(tri-n-butyltin)oxide, $[(n-C_4H_9)_3Sn]_2O$, and 0.0045 mmol of cyclopentadienyltitanium trichloride, $C_5H_5TiCl_3$. The mixture was stirred by a magnet stirrer for 22 h at 25° C. Then the content of the bottle was mixed with 5-time excess (by volume) of isopropanol and 1.33 g of crystalline syndiotactic polystyrene (yield 29.3%) was recovered by filtration. The polymer had a melting point of 259.8° C. 90.0% of the polymer was insoluble in methylethylketone.

Example 2

To a glass bottle capped with a septum and flushed with nitrogen were added: 20 cc of purified toluene, 5 cc of purified styrene, 7.0 mmol of TMA, 0.8 cc (1.61 mmol) of $[(n-C_4H_9)_3Sn]_2O$, and 0.0045 mmol of $C_5H_5TiCl_3$. The mixture was stirred by a magnet stirrer for 2 h at 60° C. Then the content of the bottle was mixed with excess of isopropanol and 0.43 g of crystalline syndiotactic polystyrene (yield 9.4%) was recovered by filtration. The polymer had a melting point of 248.6° C.

Example 3

To a glass bottle capped with a septum and flushed with nitrogen were added: 20 cc of purified toluene, 5 cc of purified styrene, 3.5 mmol of TMA, 0.30 g (1.66 mmol) of trimethyltin hydroxide, $(CH_3)_3SnOH$, and 0.0045 mmol of $C_5H_5TiCl_3$. The mixture was stirred by a magnet stirrer for 24 h at 25° C. Then the content of the bottle was mixed with excess of isopropanol and 0.32 g of crystalline syndiotactic polystyrene (yield 7.0%) was recovered by filtration.

Example 4

To a glass bottle capped with a septum and flushed with nitrogen were added: 20 cc of purified toluene, 5 cc of purified styrene, 3.8 mmol of TMA, 0.20 g (1.21 mmol) of dimethyltin oxide, $(CH_3)_2SnO$, and 0.0045 mmol of $C_5H_5TiCl_3$. The mixture was stirred by a magnet stirrer for 22 h at 25° C. Then the content of the bottle was mixed with excess of isopropanol and 0.53 g of crystalline syndiotactic polystyrene (yield 11.6%) was recovered by filtration.

Example 5

To a glass bottle capped with a septum and flushed with nitrogen were added: 20 cc of purified toluene, 5 cc of purified styrene, 5.6 mmol of TMA, 1.4 cc (2.82 retool) of $[(n-C_4H_9)_3Sn]_2O$, and 0.0055 mmol of cyclopentadienyltitanium triphenoxide, $C_5H_5Ti(OC_6H_5)_3$. The mixture was stirred by a magnet stirrer for 22 h at 25° C. Then the content of the bottle was mixed with excess of isopropanol and 1.78 g of crystalline syndiotactic polystyrene (yield 39.2% ) was recovered by filtration. The polymer had a melting point of 250.3° C. 89.7% of the polymer was insoluble in methylethylketone.

Example 6

To a glass bottle capped with a septum and flushed with nitrogen were added: 20 cc of purified toluene, 5 cc of purified styrene, 5.6 mmol of TMA, 1.4 cc (2.82 mmol) of $[(n-C_4H_9)_3Sn]_2O$, and 0.0067 mmol of titanium tetraisopropoxide, $Ti(Oi-C_3H_7)_4$. The mixture was stirred by a magnet stirrer for 22 h at 25° C. Then the content of the bottle was mixed with excess of isopropanol and 0.83 g of crystalline syndiotactic polystyrene (yield 18.2% ) was recovered by filtration. The polymer had a melting point of 265.3° C. 90.5% of the polymer was insoluble in methylethylketone.

Example 7

To a glass bottle capped with a septum and flushed with nitrogen were added: 50 cc of purified toluene, 20 cc of purified p-methylstyrene, 7.0 mmol of TMA, 2.0 cc (3.92 mmol) of $[(n-C_4H_9)_3Sn]_2O$, and 0.0090 mmol of $C_5H_5TiCl_3$. The mixture was stirred by a magnet stirrer for 20 h at 25° C. Then the content of the bottle was mixed with excess of isopropanol and 5.77 g of amorphous poly(p-methylstyrene) (yield 32.1%) was recovered by filtration.

Example 8

To a glass bottle capped with a septum and flushed with nitrogen were added: 20 cc of purified toluene, 3.0 cc of purified styrene, 2.0 cc of purified p-methylstyrene, 2.8 mmol of TMA, 0.7 cc (1.412 mmol) of $[(n-C_4H_9)_3Sn]_2O$, and 0.0045 mmol of $C_5H_5TiCl_3$. The mixture was stirred by a magnet stirrer for 22 h at 25° C. Then the content of the bottle was mixed with excess of isopropanol and 0.66 g of amorphous styrene-p-methylstyrene copolymer (yield ca. 14%) was recovered by filtration. The copolymer had a softening point of 122° C.

What is claimed is:

1. A process for polymerizing styrene by contacting it under polymerization conditions with a catalyst composition comprising at least three components:
   (i) trimethylaluminum,
   (ii) at least one of the organotin compounds with general formulae:

$R_1R_2R_3Sn-O-SnR_4R_5R_6$ or $R_1R_2R_3Sn-OH$ or $R_1R_2SnO$ or $R_1Sn(O)OH$;

wherein $R_1$, $R_2$, $R_3$, $R_4$, $R_5$ and $R_6$ are the same or different $C_1-C_{20}$ alkyl groups or aryl groups or alkylaryl groups,
   (iii) at least one derivative of a transition metal having the formula $Cp_nMA_{m-n}$, wherein
   M is a metal selected from the group of titanium, zirconium and hafnium;
   Cp is a cyclopentadienyl or a substituted cyclopentadienyl group, wherein one or several substituents are alkyl groups of 1 to 6 carbon atoms;
   A is selected from the group consisting of a halogen, hydrogen, or an oxyhydrocarbyl group OR', wherein R' is a $C_1-C_6$ linear or branched alkyl group, a substituted or non-substituted aryl group, or an arylalkyl group;
   n is 0 or 1; and m is 4 or 3;
   provided that the molar ratio between said trimethylaluminum and the organotin compound is higher than 1.

2. The process of claim 1, wherein the organotin compound is $R_1R_2R_3Sn-O-SnR_4R_5R_6$ or $R_1R_2R_3Sn-OH$.

3. The process of claim 1, wherein m is 4.
4. The process of claim 3, wherein n is 1 and Cp is a cyclopentadienyl group.
5. The process of claim 4, wherein n is 1 and Cp is a substituted cyclopentadienyl group.
6. The process of claim 2, wherein the transition metal is zirconium or hafnium.
7. The process of claim 2, wherein m is 4.
8. The process of claim 6, wherein m is 4.
9. The process of claim 8, wherein n is 1 and Cp is a cyclopentadienyl group.
10. The process of claim 8, wherein n is 1 and Cp is a substituted cyclopentadienyl group.
11. The process of claim 9, wherein $R_1$, $R_2$, $R_3$, $R_4$, $R_5$ and $R_6$ are $C_1-C_6$ alkyl groups.
12. The process of claim 9, wherein $R_1$, $R_2$, $R_3$, $R_4$, $R_5$ and $R_6$ are $C_1-C_4$ alkyl groups.
13. The process of claim 12, wherein the transition metal is titanium.

14. The process of claim 1, wherein the transition metal component is cyclopentadienyltitanium trichloride.

15. The process of claim 1 wherein $R_1R_2R_3Sn-O-SnR_4R_5R_6$ is bis(tri-n-butyltin)oxide.

16. The process of claim 1 wherein $R_1R_2R_3Sn-O-SnR_4R_5R_6$ is bis(triethyltin)oxide.

17. The process of claim 1, wherein $R_1R_2SnO$ is dimethyltin oxide.

18. The process of claim 1, wherein $R_1R_2SnO$ is di(n-butyl)tin oxide.

19. The process of claim 1, wherein the organotin compound is selected from the group consisting of bis(tri-n-butyltin)oxide; bis(triethyltin)oxide, trimethyltin hydroxide, dimethyltin oxide, di(n-butyl)tin oxide, and n-butyltin hydroxide oxide.

20. The process of claim 1, wherein m is 4, n is 1 and A is an oxyhydrocarbyl group.

21. A process of claim 20 where A is a phenoxy group.

22. A process for producing syndiotactic polystyrene comprising contacting a feed comprising styrene, under polymerization conditions, with a catalyst composition comprising at least three components:
(i) trimethylaluminum,
(ii) at least one of the organotin compounds with general formulae:

$R_1R_2R_3Sn-O-SnR_4R_5R_6$ or $R_1R_2R_3Sn-OH$ or $R_1R_2SnO$ or $R_1Sn(O)OH$;

wherein $R_1$, $R_2$, $R_3$, $R_4$, $R_5$ and $R_6$ are the same or different $C_1-C_{20}$ alkyl groups or aryl groups or alkylaryl groups,
(iii) at least one derivative of a transition metal having the formula $Cp_nMA_{m-n}$, wherein
M is a metal selected from the group of titanium, zirconium and hafnium;
Cp is a cyclopentadienyl or a substituted cyclopentadienyl group, wherein one or several substituents are alkyl groups of 1 to 6 carbon atoms;
A is selected from the group consisting of a halogen, hydrogen, or an oxyhydrocarbyl group OR', wherein R' is a $C_1-C_6$ linear or branched alkyl group, a substituted or non-substituted aryl group, or an arylalkyl group;
n is 0 or 1; and m is 4 or 3;
provided that the molar ratio between said trimethylaluminum and the organotin compound is higher than 1.

23. The process of claim 22, wherein the organotin compound is $R_1R_2R_3Sn-O-SnR_4R_5R_6$ or $R_1R_2R_3Sn-OH$.

24. The process of claim 22, wherein m is 4.

25. The process of claim 24, wherein n is 1 and Cp is a cyclopentadienyl group.

26. The process of claim 25, wherein n is 1 and Cp is a substituted cyclopentadienyl group.

27. The process of claim 23, wherein the transition metal is zirconium or hafnium.

28. The process of claim 23, wherein m is 4.

29. The process of claim 27, wherein m is 4.

30. The process of claim 29, wherein n is 1 and Cp is a cyclopentadienyl group.

31. The process of claim 29, wherein n is 1 and Cp is a substituted cyclopentadienyl group.

32. The process of claim 30, wherein $R_1$, $R_2$, $R_3$, $R_4$, $R_5$ and $R_6$ are $C_1-C_6$ alkyl groups.

33. The process of claim 30, wherein $R_1$, $R_2$, $R_3$, $R_4$, $R_4$ and $R_6$ are $C_1-C_4$ alkyl groups.

34. The process of claim 33, wherein the transition metal is titanium.

35. The process of claim 22, wherein the transition metal component is cyclopentadienyltitanium trichloride.

36. The process of claim 22 wherein $R_1R_2R_3Sn-O-SnR_4R_5R_6$ is bis(tri-n-butyltin)oxide.

37. The process of claim 22 wherein $R_1R_2R_3Sn-O-SnR_4R_5R_6$ is bis(triethyltin)oxide.

38. The process of claim 22, wherein $R_1R_2SnO$ is di(n-butyl)tin oxide.

39. The process of claim 22, wherein $R_1R_2SnO$ is di(n-butyl)tin oxide.

40. The process of claim 22, wherein the organotin compound is selected from the group consisting of bis(tri-n-butyltin)oxide; bis(triethyltin)oxide, trimethyltin hydroxide, dimethyltin oxide, di(n-butyl)tin oxide, and n-butyltin hydroxide oxide.

41. The process of claim 22, wherein m is 4, n is 1 and A is an oxyhydrocarbyl group.

42. A process of claim 41 where A is a phenoxy group.

* * * * *

UNITED STATES PATENT AND TRADEMARK OFFICE
CERTIFICATE OF CORRECTION

PATENT NO. : 5,326,837

DATED : July 5, 1994

INVENTOR(S) : Yury V. Kissin

It is certified that error appears in the above-identified patent and that said Letters Patent is hereby corrected as shown below:

Col. 6, line 27, Claim 33, delete "$R_4$, $R_4$ and $R_6$" and insert --$R_4$, $R_5$ and $R_6$--.

Col. 6, line 39, Claim 38, delete "di(n-butyl)tin oxide" should read --dimethyltin oxide--.

Signed and Sealed this

Twentieth Day of September, 1994

BRUCE LEHMAN

*Attest:*

*Attesting Officer*          *Commissioner of Patents and Trademarks*